US005592869A

United States Patent [19]
Zittel

[11] Patent Number: 5,592,869
[45] Date of Patent: Jan. 14, 1997

[54] OPEN THROAT BLANCHER WITH SUPPORT BRACES

[75] Inventor: David R. Zittel, Columbus, Wis.

[73] Assignee: Lyco Manufacturing Inc., Columbus, Wis.

[21] Appl. No.: 649,300

[22] Filed: May 17, 1996

[51] Int. Cl.$^6$ .............. A23L 3/00; A23N 12/00; A47J 37/12; F25D 25/02
[52] U.S. Cl. .............. 99/348; 99/404; 99/409; 99/516; 99/536; 100/117; 100/145; 134/65; 134/132; 366/234; 366/318
[58] Field of Search .............. 99/348, 352–355, 99/360, 403–409, 443 C, 443 R, 470, 477–479, 516, 517, 536; 134/65, 132; 100/117, 145; 366/234, 318, 319

[56] References Cited

U.S. PATENT DOCUMENTS

| | | | |
|---|---|---|---|
| 1,231,002 | 6/1917 | Steere | 134/132 |
| 1,290,396 | 1/1919 | Steere | 134/132 |
| 1,779,046 | 10/1930 | McNaney | 134/132 |
| 1,806,957 | 5/1931 | Stocking | 134/132 |
| 2,314,871 | 3/1943 | DeBack | 134/65 |
| 2,909,872 | 10/1959 | Kearney et al. | 134/132 |
| 3,135,668 | 6/1964 | Wesson | 134/132 |
| 3,484,360 | 12/1969 | Sandrock | 366/234 |
| 3,760,714 | 9/1973 | Lortz | 99/404 |
| 4,291,619 | 9/1981 | Hunt et al. | 100/117 |
| 4,410,553 | 10/1983 | McGinty | 426/243 |
| 5,146,841 | 9/1992 | Zittel | 99/348 |
| 5,327,817 | 7/1994 | Zittel | 99/348 |
| 5,329,842 | 7/1994 | Zittel | 99/348 |
| 5,341,729 | 8/1994 | Zittel | 99/409 X |
| 5,427,015 | 6/1995 | Zittel | 99/348 |
| 5,429,041 | 7/1995 | Zittel | 99/404 X |

*Primary Examiner*—Timothy F. Simone
*Attorney, Agent, or Firm*—Nilles & Nilles, S.C.

[57] ABSTRACT

A blancher having a tank and an elongate generally cylindrical and hollow perforate drum rotatably received in the tank with the drum including an inlet end plate with a food product inlet opening adjacent an end of a support core that is spaced from the inlet opening by at least two braces of non-straight construction to allow food product to enter the drum without being obstructed adjacent the inlet opening. The braces increase the structural rigidity of the drum enabling blanchers to be constructed having axial lengths greater than 24 feet and drum diameters greater than 72 inches while also being of open throat construction and having an inlet opening diameter greater than the outer diameter of the core. Each brace is preferably generally L-shaped having a leg radially outwardly extending from the core which radially outwardly spaces an axially extending brace leg from the inlet opening where it is attached to the inlet end plate for enabling product to enter the drum without being obstructed by any brace. In one preferred embodiment, the brace has a generally flat leading edge when immersed. In another preferred embodiment, the brace has a convex leading edge for deflecting product. In a still further embodiment, the brace has a concave leading edge for catching a layer of water along its leading edge for cushioning product impacting against the brace.

23 Claims, 5 Drawing Sheets

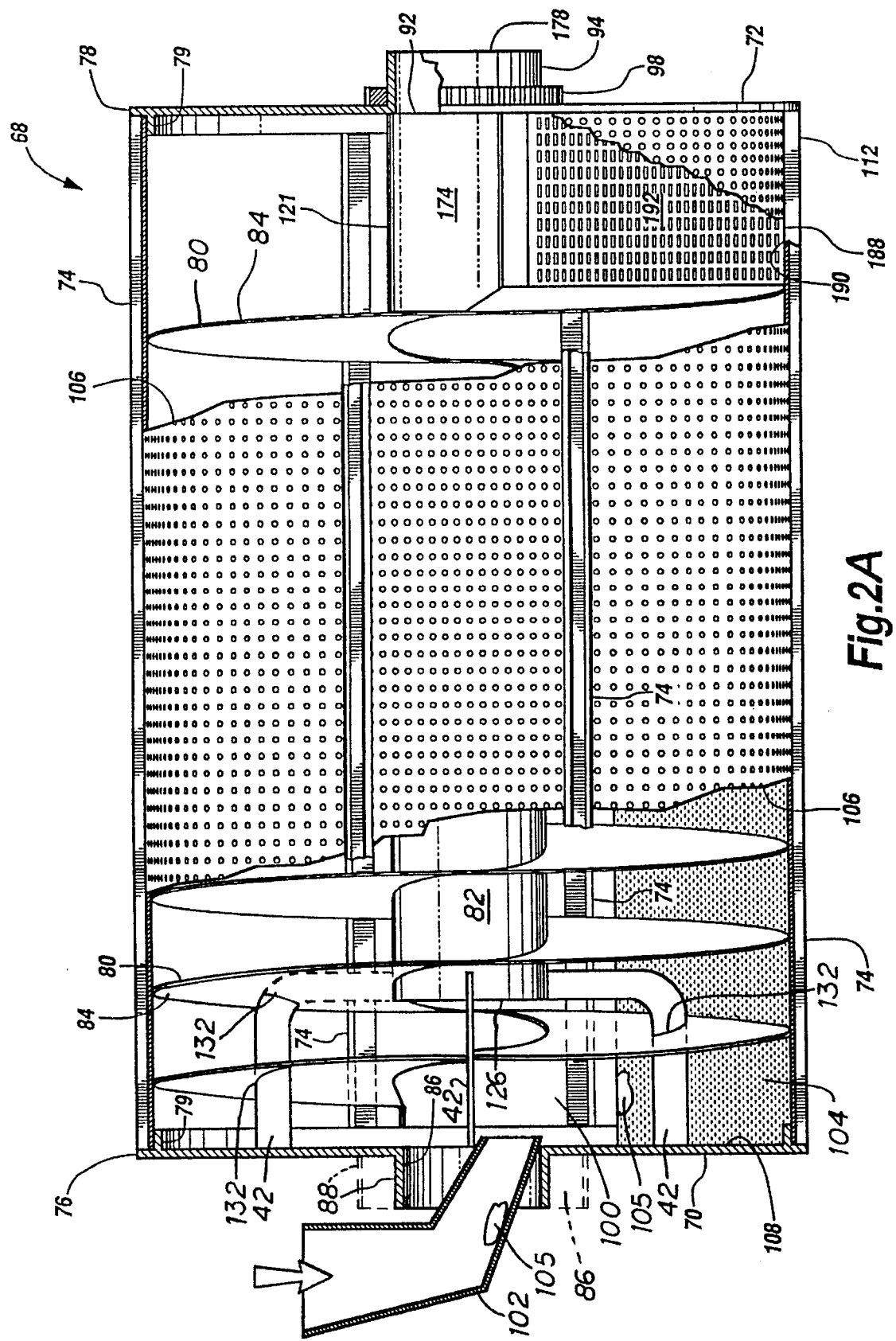

OPEN THROAT BLANCHER WITH SUPPORT BRACES

FIELD OF THE INVENTION

The present invention relates to industrial food processing equipment in general and more particularly to open throat blanchers.

BACKGROUND OF THE INVENTION

Hot water rotary drum blanchers have long been used in the food processing industry to blanch or cook a continuous throughput of food product such as pasta, green peas, corn, beans and other processed food and vegetables. Uniformity and product integrity are paramount concerns in preparing food for human consumption. To advance the food product through the blancher in a gentle and non-destructive manner, helical augers mounted within a water filled tank have long been used. The auger is mounted within a cylindrical drum having a perforated steel screen skin which allows water in the tank to flow freely into the interior of the drum. Rotation of the drum gently advances food product from the tank inlet end to the tank discharge end.

At one time, these augers were mounted on a central drive shaft and were driven directly by an engaged sprocket and motor. A central drive shaft, however, presented several problems. First, the extension of the drive shaft axially through the inlet end of the tank interfered with the introduction of food product into the cylindrical drum. Furthermore, food product coming into contact with the central shaft was subject to damage. In addition, experience showed that central drive shafts were prone to breakage.

Conventional blanchers have eliminated the breakage problem of the central drive shaft by mounting the helical auger flights on a central cylindrical core which extends through the inlet and outlet ends of the blancher tank to define cylindrical journals which are supported on two rotatable trunnions at each end. The cylindrical core is of sufficient diameter to allow the introduction of an infeed chute through the inlet journal. To allow the food product to pass into and exit from the cylindrical drum, the core does not completely extend to the inlet and outlet ends of the blancher tank. Rather, a number of symmetrically spaced straight steel bars that are spaced a distance from the rotational axis of the drum equal to the radius of the core extend from each end of the core respectively to the inlet end and the outlet end. While the construction and arrangement of the bars and the core are sufficiently structurally rigid and do not interfere with the product introduction through the infeed chute, at the inlet end, the bars continually pass through the path of infed product during rotation of the bars, the core and the auger flights. As a result, the rotating bars can come into contact with infed food product and can damage product, if it is at all delicate.

This is because the bars extend from the end of the core parallel to the axis of rotation of the drum toward the inlet end and are spaced outwardly from the radius the same distance as the radius of the core. As a result of this construction, infed food product can be contacted by one or more rotating bars very shortly upon entering the water. Since this contact can occur shortly after entering the water, infed product can relatively severely impact against a bar increasing the likelihood that it will be damaged. Moreover, these bars are of relatively small cross section which further increases the likelihood of damaging product because no significant layer of cushioning water can build up along the leading edge of each bar while it is immersed in the water.

If the product is in pouches, these bars impacting against the pouches can burst pouches, undesirably causing solids to be dispersed within the drum and tank. If solids are dispersed within the water in the tank, it can require undesirable and costly environmental treatment before the tank water can be disposed. This type of prior art cored blancher construction is further disclosed and shown in FIG. 1 of U.S. Pat. No. 5,146,841.

Additionally, the construction and arrangement of the bars and auger core of these prior art blanchers have traditionally limited the size of the inlet opening to less than or about equal to the diameter of the auger core because the bars are attached to the end of the core and extend parallel to the drum axis of rotation. This construction also undesirably limits the amount of food product that can be infed into the drum at one time.

A commercially successful blancher that solves this problem is disclosed in the aforementioned '841 patent, which is assigned to the assignee herein. To enable the diameter of the inlet opening to be increased to a size larger than the diameter of the auger core, the end of the core does not extend to the inlet opening and is not connected to the inlet end of the drum by bars. The blancher drum of the '841 patent has support channels of generally C-shaped cross section that extend axially from the inlet plate to the outlet plate of the drum to help provide sufficient structural rigidity to the drum, helical augers, and core enabling the connecting bars between the core and inlet end of the drum to be eliminated. While this blancher drum construction has proven to be extremely commercially successful for blanchers having an axial length of up to about twenty four feet and a drum diameter of about seventy-two inches, there exists a desire to improve upon the structural rigidity of blanchers having a larger diameter and/or a longer axial length.

What is needed is a rotating blancher drum which has improved structural rigidity while providing minimal obstruction to food product being infed into the drum through the inlet. What is also needed is a drum possessing the requisite structural rigidity for producing a blancher having a relatively long length and/or large diameter. What is still further needed is an improved assembly for securing the core and/or auger to the inlet end plate of the drum to provide the desired structural rigidity to the drum while also minimizing and preferably substantially preventing destruction of food product entering the drum.

SUMMARY OF THE INVENTION

A blancher for blanching food product having a tank with a drum rotatably received in the tank that has a support core received in the drum with one end of the core connected to an inlet end plate of the drum by support braces that space the core end away from an inlet opening in the end plate to allow food product to enter the drum. So that the braces do not obstruct entry of product into the drum, each brace has a portion that extends axially to the inlet end plate and another portion that extends radially outwardly from the core to space the axially extending brace portion radially outwardly away from the inlet opening. As a result of the construction and arrangement of the braces, core, and inlet end plate (1) the structural rigidity of the entire drum is enhanced enabling blanchers having a length in excess of 24 feet and a drum diameter in excess of 72 inches to be constructed, and (2) the inlet opening can be larger than the outer diameter of the core thereby advantageously enabling greater product throughput and larger sized product to be blanched.

The tank is defined by a concave shaped multi-segmented wall that has an inlet end and an outlet end and is carried by a support frame. During blanching, the tank holds several inches of water that is heated to and maintained at a temperature of between about 180° Fahrenheit and about 205° Fahrenheit by one or more steam manifolds inside the tank. To permit the drum to rotate, the support frame carries two pair of trunnions with one pair being adjacent the inlet end of the tank and the other pair being adjacent the outlet end of the tank. At the inlet end, the tank has an arcuate inlet opening, and at the outlet end, the tank has an arcuate outlet opening.

Received within the tank, the drum is of elongate and generally cylindrical construction and is rotatably carried on trunnions. At the inlet end, the drum has an inlet end plate with an axially outwardly flared journal that rides upon the inlet end trunnions and which generally defines an inlet opening that preferably is of open throat construction. At the outlet end, the drum has an outlet end plate with an axially outwardly flared journal that rides upon the outlet end trunnions and which generally defines an outlet opening of the drum. A generally cylindrical outer skin forms an outer sidewall of the drum and is perforate for allowing water in the tank to enter the drum while keeping product and other solid matter out of the tank. Covering and enclosing the drum is a hinged cover.

In between the two end plates, there is an elongate and generally cylindrical support core that is preferably coaxially received within the drum and which is preferably generally coaxial with an axis of rotation of the drum. To facilitate flow of food product through the drum during rotation of the drum, the core carries an auger comprised of a plurality of connected and preferably continuous helical auger flights.

Relatively close to the discharge end of the drum, the auger and tube terminate in a discharge region of the drum to provide sufficient space to enable blanched food product that has traveled completely through the drum to be removed from the blancher. Preferably, the discharge region has a single scoop discharge to lift and discharge food product from the drum and blancher. Alternatively, several conventional lift buckets can be used in the discharge region to lift and discharge product from the drum and blancher.

Each support brace connecting the core to the inlet end plate is of non-straight construction having a first leg that extends generally radially outwardly from the core and a second leg which extends axially toward and is connected to the inlet end plate. As a result of the radial outward spacing provided by the first leg, the second leg is preferably spaced sufficiently far radially outwardly from the inlet opening so that the brace does not obstruct entry of food product into the drum through the inlet opening. As a result of the second leg being spaced radially outwardly of the inlet opening, the inlet opening preferably can be constructed so as to have a diameter greater than the outer diameter of the core for enabling larger food product and/or a greater volume of food product to enter the drum. Preferably, the second leg of each brace is spaced at least about a couple inches radially outwardly of the outer radial edge of the inlet opening, at least where the brace attaches to the inlet plate, for permitting unobstructed entry of food product into the drum.

In one preferred drum construction, flights of the helical auger are received in slots in braces to enable the auger flights to extend to adjacent the inlet end plate. Preferably, the auger flights are received in slots in the braces and welded to the braces. Preferably, the auger flights connect to the inlet end plate in a blancher drum of this construction. In a second preferred drum construction, the auger can be constructed such that the flights terminate adjacent the inlet end of the support core.

In a first preferred brace embodiment, the cross section of the second leg of the brace is preferably generally rectangular. In a second preferred brace embodiment, the cross section of the second leg is arcuate and has a generally convex leading edge for deflecting, with a minimum of impact, food product in the path of travel of the brace while the brace is immersed in water. One preferred shape of the second brace is substantially convexo-concave. In a third brace embodiment, the cross section of the second leg is also arcuate but has a generally concave leading edge for accumulating a cushioning boundary layer of water in front of the leading edge to minimize and preferably prevent impact of product with the brace. Preferably, each of the brace constructions has a leading edge surface of at least about two inches in width to promote formation of a cushioning boundary layer along the leading edge to help minimize and preferably prevent impact of food product with the brace. Of course, other brace cross sectional shapes are possible.

As a result of the non-straight, generally L-shaped brace construction, structural rigidity of the drum is improved enabling a blancher to be constructed having an axial length in excess of 24 feet, a drum diameter in excess of 72 inches, or a combination thereof. For example, a blancher of this invention can be constructed having both an axial length greater than about 24 feet and a drum diameter in excess of about 72 inches. In one preferred embodiment, the blancher has an axial length of 32 feet and a drum diameter of 84 inches. In another preferred embodiment, the blancher has an axial length of 32 feet and a diameter of 96 inches.

Objects, features and advantages of this invention are to provide a brace for a blancher drum that improves the structural rigidity of the drum enabling blanchers to be constructed having longer axial drum lengths and diameters; that is constructed and arranged to permit larger open throat inlet opening diameters to increase the rate at which product can be fed into the drum while also advantageously enabling the use of longer and bigger drums to increase blancher capacity, product volume, and throughput; enables the drum to be constructed with an inlet opening diameter greater than the core diameter to increase the size and amount of product that can enter the drum; improves heat transfer to food product that has entered the drum by agitating the product when the brace is immersed in water; improves heat transfer to food product that has entered the drum by helping to "dunk" the product to more fully immerse the food product in water; and is a brace that is rugged, simple, flexible, reliable, and durable, and which is of economical manufacture and is easy to assemble and use.

BRIEF DESCRIPTION OF THE DRAWINGS

These and other objects, features, and advantages of this invention will become apparent from the following detailed description of the best mode, appended claims, and accompanying drawings in which:

FIG. 2A is a side elevation view of a first preferred embodiment of the blancher drum shown in FIG. 1 with parts broken away to show more clearly the inlet and outlet end regions of the drum;

DETAILED DESCRIPTION OF THE INVENTION

Figure 1:
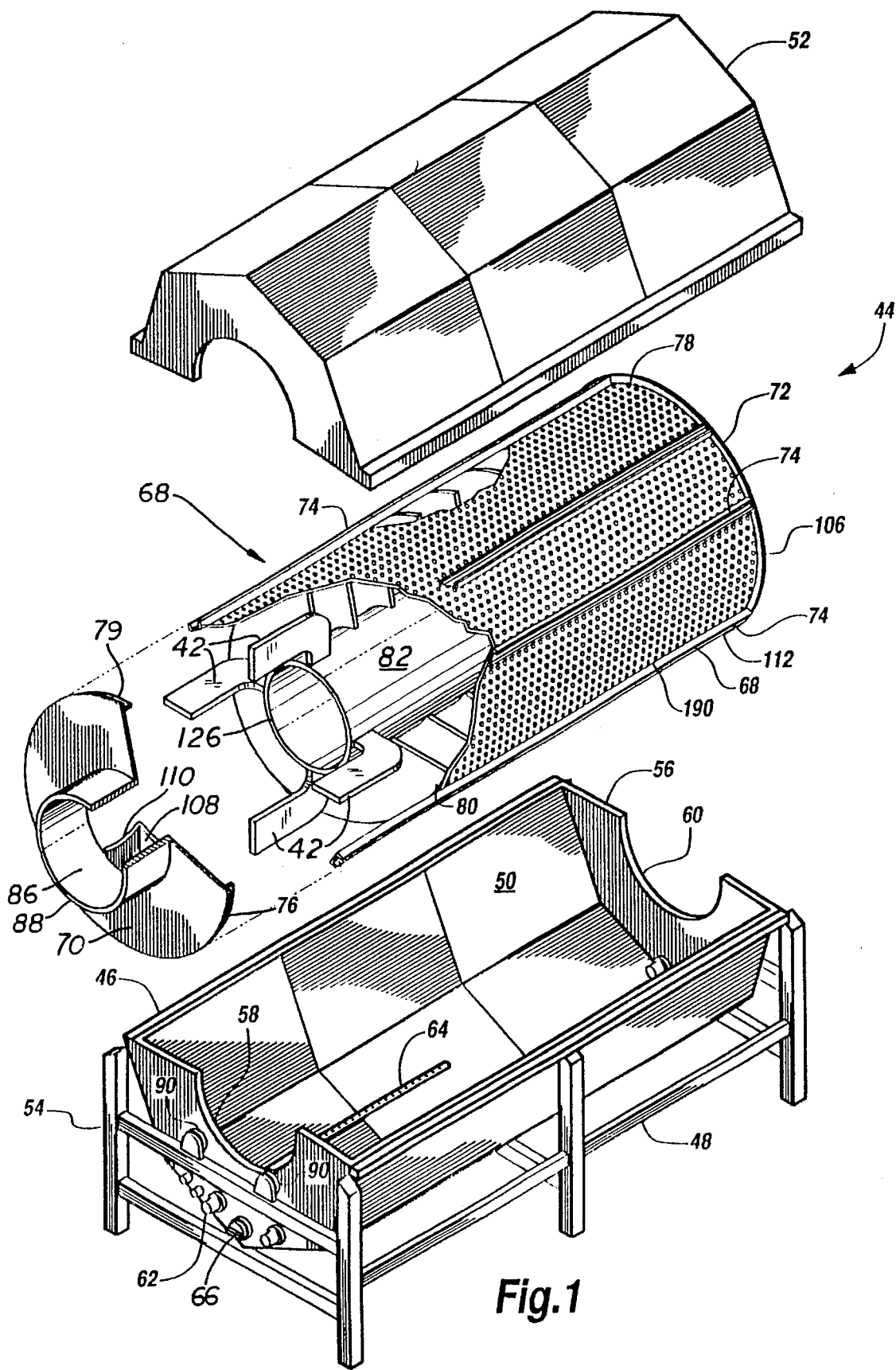
FIG. 1 is an exploded isometric view of a blancher of this invention with a portion of the helical auger missing to more clearly show support braces attaching the core to the inlet end plate of the blancher drum.
Figure 2B:
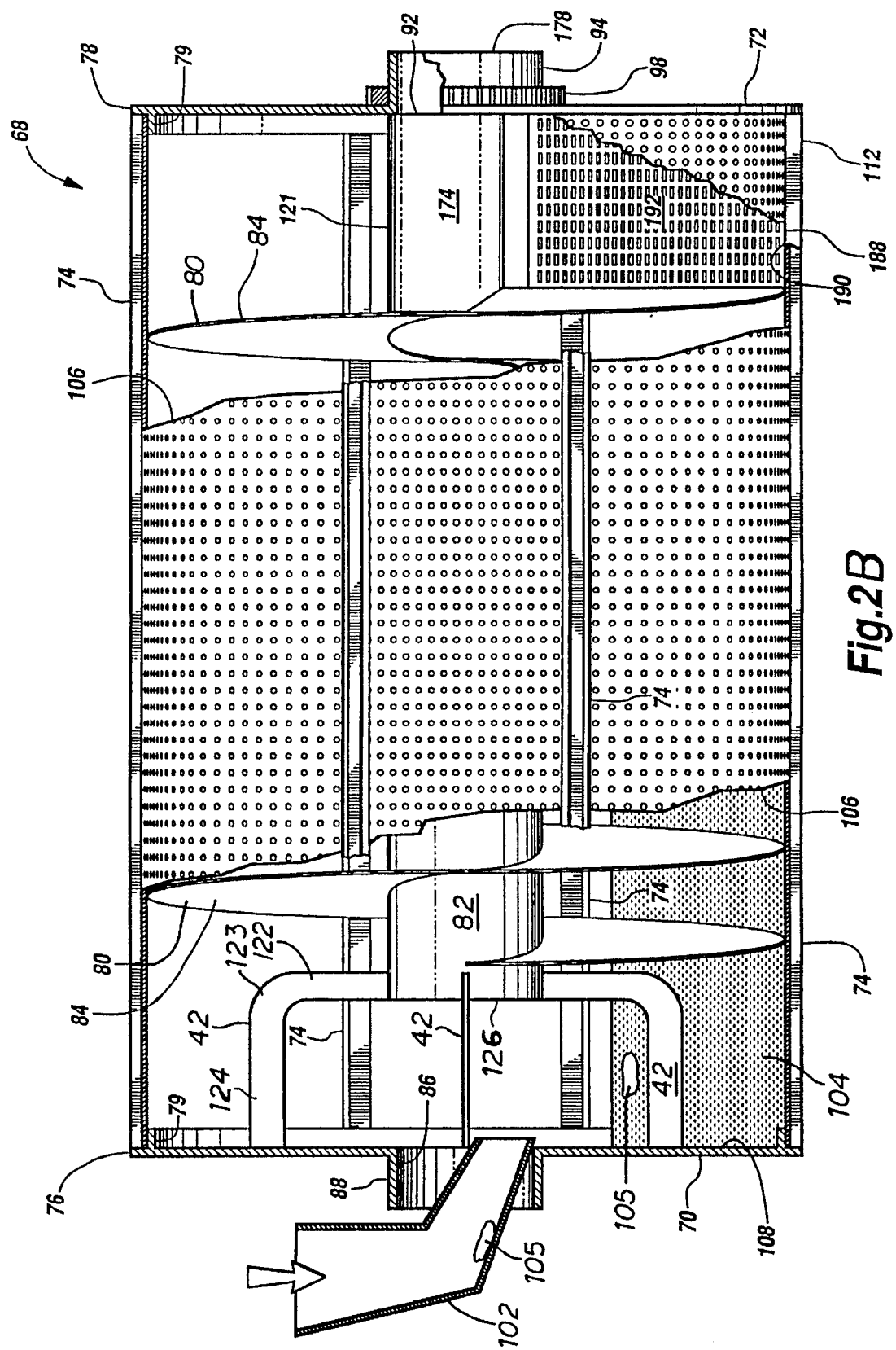
FIG. 2B is a side elevation view of a second preferred embodiment of the blancher drum.
Figure 3:
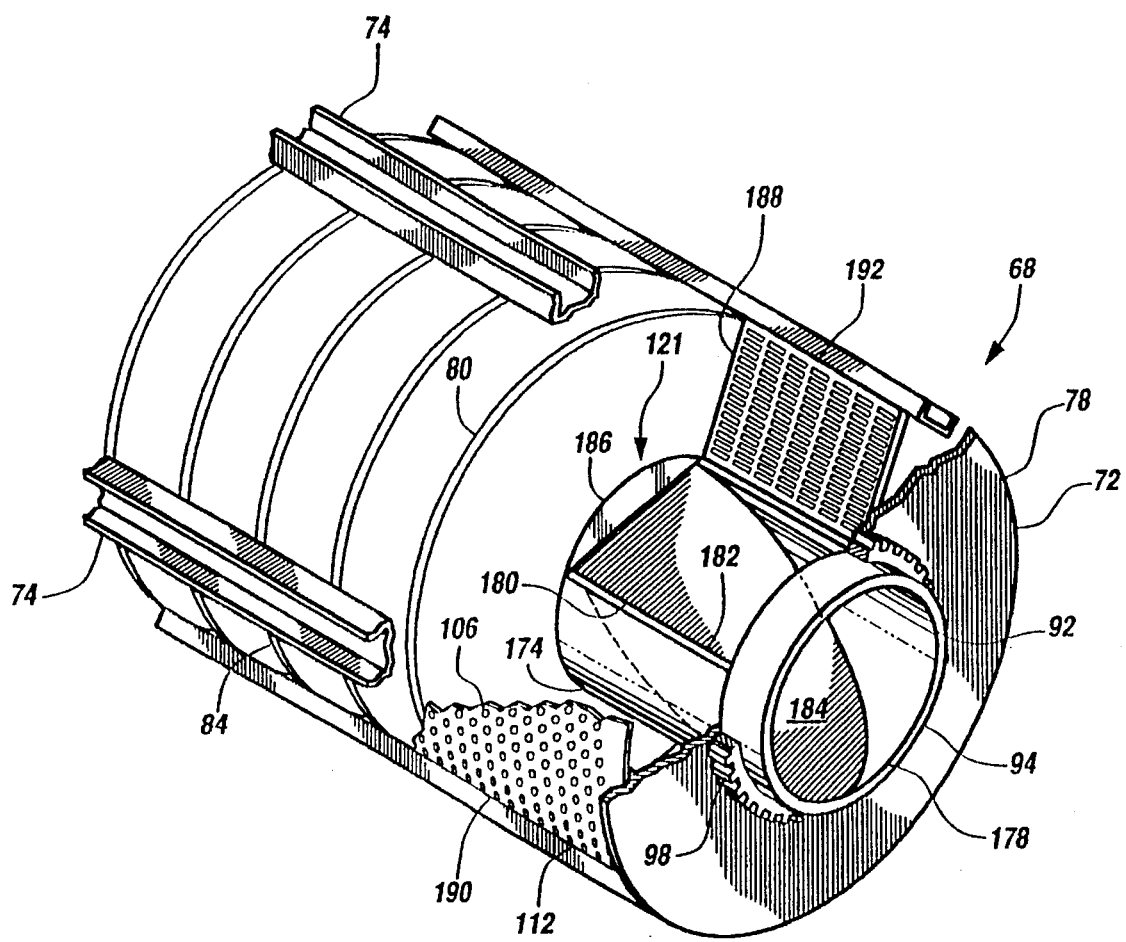
FIG. 3 is a fragmentary isometric view of the outlet end region of the blancher drum with pans broken away to illustrate more clearly the drum outlet.

FIGS. 1–3 illustrate a blancher 44 having a rotatable drum 68 received in a tank 46 with a plurality of auger flights 84 in the drum 68 carried by a generally cylindrical support and alignment core 82 which is attached to an inlet end plate 70 of the drum 68 by support braces 42 of this invention for increasing the structural rigidity of the drum 68. Each support brace 42 is non-straight and preferably generally L-shaped ensuring that a brace 42 can only impact food product 105 entering the drum 68 while the brace 42 is under water thereby cushioning, minimizing and preferably preventing direct impact with an immersed brace. Preferably, impact is cushioned and prevented by a layer of water formed along the leading surface of a fully immersed brace 42. Additionally, the non-straight shape of each brace 42 advantageously permits the drum inlet opening 86 to be sized larger than the diameter of the core 82 for increasing the amount of product that can be introduced through the drum inlet opening 86 at one time. To permit unobstructed entry of product into the drum 68, the braces 42 space the inlet axial end of the core 82 a sufficient distance from the drum inlet opening 86.

The blancher 44 of this invention provides a rigid and durable structure which is substantially free of obstructions within the inlet end or "throat" region 100 of the drum. The blancher 44, as is shown in FIG. 1, has an elongated and open tank 46 which is supported by a frame 48. The tank 46 has a four segment wall 50 with a plurality of drains (not shown) preferably located in a low portion of the tank. An elongated and vaulted cover 52 fits over and covers the tank 46. The tank 46 and cover 52 have an inlet end 54 and a discharge end 56.

The inlet end 54 of the tank 46 has a fixture 62 for the admission of steam into a steam manifold 64 located on a tank wall 50 and within the tank 46. During operation, steam admitted into the tank 46 through the manifold 64 serves to raise the water temperature within the blancher 44 to an appropriate blanching level of between about 180° F. and about 205° F. or greater. Each tank 46 is equipped with at least one and preferably two or more steam manifolds 64. One or more cleanout ports 66 are also located at each end of the tank 46 to facilitate removal of water from the tank 46 and cleaning of the tank 46.

Fixtures are also provided in the inlet end 54 and the tank 46 for the introduction of a thermometer and/or thermocouple (not shown) for monitoring the temperature of the fluid contained within the tank 46. The cover 52 can be attached to the tank 46 by a hinge. The cover 52 and tank 46 can be removably secured to each other such that it can be opened from either side, such as in the manner disclosed in U.S. Pat. No. 4,788,476 to Zittel, the disclosure of which is hereby expressly incorporated by reference.

The blancher drum 68 is rotatably received within the tank 46. The support structure of the drum 68 is formed by a pair of stainless steel end plates 70 & 72 which are connected by a plurality of axially extending support channels 74 that preferably are of generally C-shaped cross section for increasing the strength and structural rigidity of the drum 68. These channels 74 extend axially from the inlet end plate 70 to the outlet or discharge end plate 72. Preferably, the channels 74 are connected to the peripheral edges 76 & 78 of the end plates 70 & 72. While the channels 74 can be welded directly to a flat portion of each of the end plates 70 & 72, they preferably are welded to an axially inwardly extending lip 79 of each plate 70 & 72. In addition to serving as a mounting surface for the channels 74, each lip 79 also advantageously makes the drum 68 stronger and more structurally rigid.

The drum 68 is enclosed by a cylinder composed of a plurality of perforated plates 106 held in place by the channels 74 and which surround the helical auger 80. It should be noted that the perforated plates illustrated in FIGS. 1–3 have been depicted with the relative dimensions of the perforations exaggerated for clarity. Preferably, the size, construction and arrangement, and density of the perforations on the plates 106 are selected to allow liquid in the tank 46 to enter the drum 68 while retaining food product, food particles, and other solid objects within the drum 68.

Stainless steel plates are welded to the core 82, which is coaxially received within the drum 68, to form a generally helical auger 80 having a plurality of auger flights 84. The auger flights 84 extend between the core 82 and the support channels 74 located at the periphery of the drum 68. The auger flights 84 are welded to the channels 74 where they engage against the channels 74. The auger 80 is thus substantially supported by the channels 74 and hence the end plates 70 & 72. Preferably, the core 82 is generally coaxially received within the drum 68 and has an axis of rotation that substantially coincides with an axis of rotation of the drum 68.

The inlet end plate 70 has portions defining a circular inlet opening 86 which is concentric with the generally cylindrical support and alignment core 82. A cylindrical journal 88 extends outwardly from the inlet end plate 70 and also helps to define the inlet opening 86 of the drum 68. When the drum 68 is received in the tank 46, the journal 88 is supported on two rotatable trunnions 90 which are preferably both mounted to the frame 48 outside the tank inlet opening 58.

Advantageously, as a result of the construction and arrangement of the core 82, braces 42 and inlet end plate 70, the diameter of the inlet opening 86 can be selected or sized to suit the particular needs of the blanching application. For example, where a particularly wide food product or a greater volume of food product is to be introduced into the drum 68, the inlet opening 86 can be much larger than the diameter of the core 82. Of course, the diameter of the drum inlet opening 86 preferably will be limited by the depth of water contained within the tank 46.

To provide a relatively unobstructed region for product to enter the drum 68 through the drum inlet opening 86, each brace 42 is radially outwardly spaced from the outer radial edge of the drum inlet opening 86 such that it is not adjacent to the outer radial edge of the inlet opening 86. Preferably, the portion of the brace 42 closest to the outer radial edge of the inlet opening 86 is spaced at least a couple of inches from the outer radial edge of the inlet opening 86.

As is depicted in FIG. 3, portions of the discharge end plate 72 define a drum discharge opening 92 for the exit of food product from the blancher drum 68. When the drum 68 is received in the tank 46, a cylindrical journal 94 that extends outwardly from the discharge end plate 72 is supported on trunnions (not shown) mounted to the frame 48.

A drive sprocket 98 is mounted to one of the journals 88 or 94 inwardly of the supporting trunnions and is driven by a prime mover that preferably is an electric motor (not shown) to rotate the drum 68 at a desired speed. The drive sprocket 98 can be located at either end of the drum 68. For blancher configurations having an inlet opening 86 substantially larger than the drum discharge opening 92, the sprocket 98 is preferably located at the discharge end plate 72 to facilitate convenient mounting of the drive motor beneath the journal.

The portion of the drum 68 between the inlet end plate 70 and the adjacent end of the core 82 is the throat region 100. It is in this region 100 that food product 105 enters through an infeed chute 102 into the interior of the drum 68. It is also in this throat region 100 that food product to be blanched first makes contact with water in the blancher 44.

In the preparation of food product preferably for human consumption, it is of great importance to preserve the integrity and uniformity of each individual piece of food product 105. Nicks, bruises, cuts, and other damage to food product are highly undesirable. Pasta, green peas, kidney beans, cut corn, and string beans are some examples of food product which are particularly sensitive to damage from contact with moving equipment parts. The generally L-shaped construction and arrangement of the braces 42 which connect the support core 82 to the inlet end plate 70 produces a generally expanded and open throat region 100 immediately adjacent the inlet opening 86 that helps to ensure that food product 105 entering the blancher 44 first comes into contact with the water 104 in the tank 46 and not with any moving part of the drum 68 to minimize and preferably prevent damage to the entering food product 105.

An infeed flight attachment 108 extends between the inlet end plate 70 and the first flight 84 of the helical auger 80. The attachment 108 serves to initially engage the infed food product 105 with the auger 80. The attachment 108 is a plate that extends from the perforated exterior plate 106 preferably adjacent to or at the beginning of the auger 80. The attachment 108 has portions defining a curved inner edge 110. The inner edge 110 of the attachment 108 is spaced a distance from the axis of the drum 68 throughout the throat region 100 such that as the flight attachment 108 rotates in unison with the drum 68 around the flow of incoming food product, its inner edge 110 is preferably clear of the flow.

When the infeed flight attachment passes through the water contained within the tank 46, the inner edge 110 is submerged so as only to make contact with the submerged food product after it is cushioned by the surrounding water. Advantageously, the braces 42 are also constructed and arranged so as only to make contact with the submerged food product once it is cushioned by surrounding water.

As is shown in FIG. 2A & 2B, the drum 68 is partially submerged in water 104 contained in the tank 46. The food product 105 will preferably be substantially completely submerged throughout most of its trip along the axial length of the blancher drum 68. During operation, the infeed flight attachment 108 preferably introduces the food product 105 to the helical auger 80 which gently advances the food product 105 from the inlet end toward the outlet end of the drum 68 as the drum 68 and auger 80 rotate.

Food product is advanced through the drum 68 by the auger 80 until the food product reaches the discharge end region 112 of the drum 68, as is depicted in more detail in FIG. 3. The auger 80 preferably terminates some distance upstream of the discharge end plate 72. To enable food product to be discharged from the blancher 44, conventional lift buckets can be constructed and arranged so as to extend between the auger 80 and the discharge end plate 72. However, in applications in which particular care must be taken not to damage the processed food product, such as for example, in handling bagged or pouched products such as soup or pasta, a single scoop discharge 121 can be used.

The discharge 121 has a semi-cylindrical chute 174 that is fixed to the drum 68. The chute 174 extends between the auger 80 and the discharge end plate 72 of the drum 68. The chute 174 has a discharge opening 178 which communicates with the discharge outlet 92 of the drum 68 in the discharge end plate 72. The chute 174 has an inclined surface 184 which extends from the rear wall 186 of the chute 174 to the discharge opening 178. The discharge 121 has a single lifting flight 188 which extends between the side wall 190 of the drum 68 and the chute 174. The lifting flight 188 has a perforated base plate 192 which is welded to one lip 182 of the chute along the chute inlet opening 180. During operation, the discharge 121 elevates food product from the water filled portions of the drum 68 to the discharge outlet opening 92 of the discharge end plate 72.

As is shown in FIG. 1, each brace 42 is attached at one end to an outer radial surface of the support core 82 and at the other end to an inner axial surface of the inlet end plate 70. A blancher 44 of this invention has at least two such braces 42 generally spaced apart about the support core 82 for enhancing the structural rigidity of the drum 68 while enabling the drum 68 to be constructed in axial lengths of greater than at least about sixteen feet. In one preferred embodiment, the blancher 44 has four braces 42 generally equiangularly spaced about the core 82 about 90° apart from each other. However, depending upon the size and length of the blancher 44, more than four braces 42 can be used.

As a result of the construction and arrangement of the braces 42, core 82 and end plate 70, a blancher 44 of this invention can advantageously be constructed having an axial length in excess of twenty-four feet long. For example, a blancher 44 of this invention having support braces 42 connecting the core 82 to the inlet end plate 70 can be constructed having lengths of, for example, twenty-five feet, twenty-six feet, thirty feet, thirty-two feet, or longer while still being sufficiently structurally rigid enough to withstand loading on the drum 68 from water 104 and product 105 received within the rotating drum 68. Of course, a blancher 44 of this invention can be constructed having an axial length of twenty-four feet or less, if desired.

Additionally, a blancher 44 of this invention can be constructed having a drum diameter in excess of seventy-two inches. For example, the drum 68 can be constructed having a diameter of seventy-three inches, seventy-four inches, eighty inches, eighty-four inches, ninety-six inches or greater. Of course, a blancher 44 of this invention can be constructed having a drum diameter of seventy-two inches or less, if desired.

In one preferred embodiment of a blancher 44 of this invention, the length of the blancher 44 is about thirty-two feet and the diameter of the drum 68 is about eighty-four inches. In another preferred embodiment of a blancher 44 of this invention, the length of the blancher 44 is about thirty-two feet and the diameter of the drum 68 is about ninety-six inches.

Figure 4:
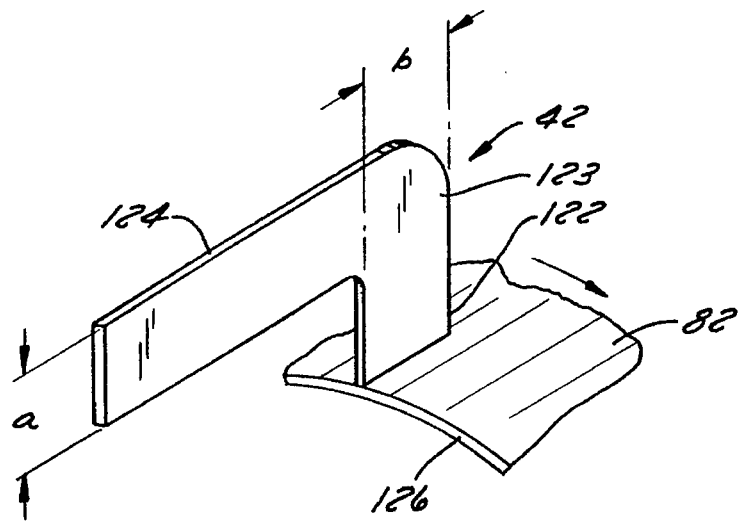
FIG. 4 is a fragmentary perspective view of the core and a first preferred brace embodiment.

As is shown in FIG. 4, the brace 42 is generally L-shaped having a first leg 122 extending generally radially outwardly from the support core 82 and a second leg 124 extending in an axial direction toward the inlet end plate 70. A generally 90° bend 123 connects the legs 122 & 124. Preferably, the inlet end plate 70, brace 42 and core 82 are all constructed of a sanitary, strong, and resilient material that preferably is a stainless steel, another suitable metal, a nylon, or a composite material. Preferably, one leg 122 of the brace 42 is welded or otherwise affixed to the core 82 and the other leg 124 of the brace 42 is welded or otherwise affixed to the inlet end plate 70.

The length of the axially extending leg 124 is preferably long enough to space the axial end 126 of the core 82 sufficiently far away from the inlet opening 58 to enable food product 105 to enter the drum 68. Preferably, the brace 42 is constructed and arranged to space the adjacent axial end 126 of the core 82 at least about ten and one-half inches from the inlet opening 58 for enabling product 105 to enter the drum 68.

Figure 5:
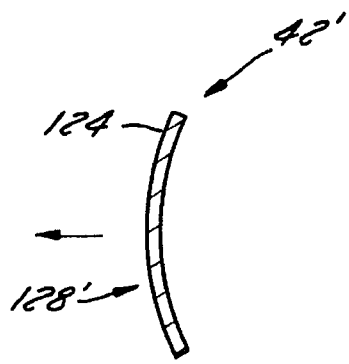
FIG. 5 is a cross section of a second preferred brace embodiment.
Figure 6:
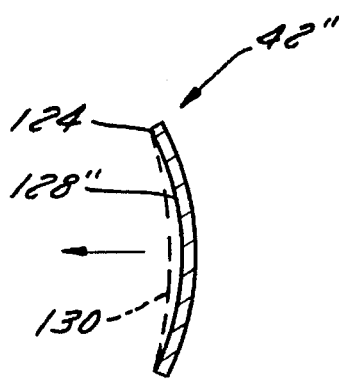
FIG. 6 is a cross section of a third preferred brace embodiment.

To impart to the drum 68 the necessary structural rigidity, each brace 42 preferably is at least about one-half inch thick and has (1) a radially extending leg 122 of a width, a, of at least about two inches, and (2) an axially extending leg 124 with a width, b, of at least about two inches. Preferably, the dimensions, a & b are both about three inches for a blancher 44 having an axial length of about thirty-two feet and a drum diameter of about eighty-four inches. For blanchers 44 having a greater length and/or greater diameter, the thickness of each brace 42 can be increased and/or either or both of the dimensions a & b of the brace 42 can also be increased. Preferably, the cross section of each leg 122 & 124 is generally rectangular, but can be oval, generally circular, square, curved, as is illustrated in FIGS. 5 & 6, or another shape. When immersed in water and rotating, each brace 42 has a leading surface 128 which preferably accumulates a layer of water 130 (shown in phantom in FIG. 6) that helps cushion any impact between food product 105 and the brace 42 for minimizing and preferably substantially completely preventing damage to food product 105 that has entered the drum 68.

In one preferred embodiment shown in FIG. 4, each brace 42 has a generally rectangular cross section. In a second preferred embodiment shown in FIG. 5, each brace 42' is curved (of generally convexo-concave shape) and has a convex leading surface 128' to deflect food products in its path of motion (indicated by the directional arrow shown in FIG. 5), to minimize and preferably substantially prevent any impact between food product and the brace 42' for preventing damage to food product that has entered the blancher 44. In a third preferred embodiment shown in FIG. 6, each brace 42" is also curved (of generally concavo-convex shape) and has a generally concave leading surface 128" for capturing a cushioning fluid boundary layer 130 (shown in phantom in FIG. 6) that helps to minimize any impact between food product and the brace 42".

As a result of each brace 42 having a leg 122 radially outwardly extending from the core 82, the generally axially extending leg 124 connecting the core 82 to the inlet end plate 70 is sufficiently radially outwardly spaced from the inlet opening 86 in the plate 70 to permit an open throat inlet construction having a diameter that is larger, if not substantially larger, than the outer diameter of the core 82. As is shown more clearly in phantom in FIG. 2A, as a result of this advantageous brace construction 42, the inlet opening 86 can be constructed to have a diameter larger than the diameter of the core 82 for permitting larger food products to be introduced into the drum 68 and for permitting larger volumes of food product to be introduced at one time into the drum 68.

In one preferred support core and auger construction shown in FIG. 2A, the helical auger 80 extends to adjacent the inlet end plate 70. Preferably, the end of the auger 80 is attached to the end plate 70, such as by welding. To accommodate extension of the auger 80 to the end plate 70, one or more of the braces 42 have slots generally indicated by reference numeral 132 for receiving an auger flight 84. In this manner, the drum 68 is constructed such that the auger flights 84 are uninterrupted from adjacent the end 126 of the core 82 to adjacent the inlet end plate 70. In a second preferred drum construction shown in FIG. 2B, the flights 84 of the helical auger 80 terminate adjacent the end 126 of the support core 82.

During operation, as the drum 68 rotates, each of the braces 42 are submerged for a portion of each drum rotation. As a brace 42 enters the water 104, it creates turbulence and agitation thereby helping to transfer heat from the water 104 to food product 105 that has entered the water 104 in the drum 68 through the inlet opening 86. Preferably, heat transfer is further improved by each submerged brace 42 causing at least some tumbling of food product 105 adjacent a submerged brace 42, due to at least in part the wake created in the water 104 behind the trailing edge of the relatively wide axially extending leg 124 of the brace 42. This wake creates turbulence and agitation helping to effect heat transfer from the water 104 to the product 105 immediately upon the product 105 entering the water 104 within the drum 68. Preferably, each brace 42 also helps to improve heat transfer by helping to cause product 105 to be fully immersed in the water 104 by helping to "dunk" the product 105 relatively shortly after its entry into the drum 68.

It is also to be understood that, although the foregoing description and drawings describe and illustrate in detail one or more embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims.

What is claimed is:

1. A blancher for blanching food product comprising:

(a) a tank having an inlet end and an outlet end;

(b) an inlet end plate positioned within the tank adjacent the inlet end and having an inlet opening;

(c) a discharge end plate positioned within the tank adjacent the outlet end and having an outlet opening;

(d) a support core received within the tank having one end adjacent the outlet end plate and its other end adjacent the inlet end plate and terminating downstream of the inlet opening such that there is a gap between the end of the core and the inlet plate to allow food product to enter through the inlet opening;

(e) an auger carried by the support core;

(f) at least two braces connecting the core to the inlet end plate with each brace having a portion extending radially outwardly from the core and another portion extending axially to the inlet plate for providing an unobstructed space adjacent the inlet opening for the entry of food product into the blancher.

2. The blancher of claim 1 wherein each brace is generally L-shaped having (i) a first leg radially outwardly extending from the support core, (ii) a second leg generally perpendicular to the first leg and which extends in an axial direction generally toward the inlet end plate, and (iii) a bend joining the two legs.

3. The blancher of claim 1 wherein the portion of the brace connected to the inlet end plate is spaced radially outwardly from the inlet opening for providing an unobstructed region adjacent the inlet opening for food product to enter the tank through the inlet opening.

4. The blancher of claim 3 wherein the inlet opening is generally circular and the portion of each brace closest to the inlet opening is spaced radially outwardly from an outer radial edge of the inlet opening.

5. The blancher of claim 4 wherein the portion of the brace closest to the inlet opening is spaced radially outwardly from the outer radial edge of the inlet opening by a distance of at least about two inches.

6. The blancher of claim 5 wherein the support core is an elongate cylinder having an outer diameter and the inlet opening has a diameter greater than the outer diameter of the core.

7. The blancher of claim 6 wherein each brace is attached to the core adjacent the axial end of the core.

8. The blancher of claim 7 wherein there are four braces spaced equiangularly about the core.

9. The blancher of claim 8 wherein the axial end of the core adjacent the inlet end plate is spaced at least about ten and one-half inches from the inlet end plate for providing sufficient space for food product to enter the tank through the inlet opening.

10. The blancher of claim 2 wherein the first leg is of generally rectangular cross section.

11. The blancher of claim 2 wherein the first leg of each brace has a leading surface that is generally flat.

12. The blancher of claim 2 wherein the first leg of each brace has a leading surface that is generally convex.

13. The blancher of claim 2 wherein the first leg of each brace has a leading surface that is generally concave.

14. The blancher of claim 1 wherein the diameter of the inlet opening is greater than the diameter of the outlet opening.

15. The blancher of claim 1 further comprising (i) a plurality of support channels axially extending between and connecting the inlet end plate and the discharge end plate, wherein the end plates and channels define a drum rotatably received within the tank, (ii) a perforated cylindrical wall enclosing the auger and extending from the inlet end plate to the discharge end plate, and (iii) wherein the core is coaxially located within the drum and the core terminates at a position spaced axially from the inlet opening such that an unobstructed infeed path is defined between the core, the auger and the inlet opening for facilitating unhindered entry of food product into the drum.

16. The blancher of claim 15 wherein the auger (i) is comprised of a plurality of generally helical flights connected at their outer peripheral edges to the support channels, (ii) has an initial flight that is continuous with the flights and which extends between the inlet end plate and the core, and (iii) wherein the initial flight has portions defining an inner edge, the inner edge being spaced radially outwardly from the axis of the tank such that when the initial flight is submerged within water contained within the tank, the inner edge is below water level.

17. The blancher of claim 15 wherein the tank has an axial length of greater than about twenty-four feet.

18. The blancher of claim 15 wherein the drum has an axial length of greater than about twenty-four feet.

19. The blancher of claim 15 wherein the blancher has an axial length of at least about thirty-two feet and the drum has a diameter of at least about eighty-four inches.

20. A blancher comprising:

(a) a tank having an inlet end and an outlet end;

(b) an inlet end plate adjacent the inlet end of the tank and having an inlet opening;

(c) a discharge end plate adjacent the outlet end of the tank and having an outlet opening;

(d) a support core received within the tank having one end adjacent the outlet end plate and its other end adjacent the inlet end plate and terminating downstream of the inlet opening such that there is a gap between the end of the core and the inlet plate to allow food product to enter through the inlet opening;

(e) an auger carried by the support core;

(f) a perforate generally cylindrical wall enclosing the auger and extending from the inlet end plate to the discharge end plate;

(g) at least two support channels extending between and connecting the inlet end plate to the discharge end plate wherein the end plates, perforate cylindrical wall, and support channels define a drum rotatably received in the tank; and (h) at least two braces connecting the core to the inlet end plate while spacing the core from the end plate with each brace having a first portion extending generally radially outwardly from the core and a second portion extending to the inlet end plate for providing sufficient space within the drum adjacent the inlet opening for substantially unobstructed entry of food product into the drum.

21. The blancher of claim 20 wherein the blancher has an axial length of at least about 32 feet.

22. The blancher of claim 20 wherein the drum has a diameter of at least about 84 inches.

23. A blancher comprising:

(a) a tank having an inlet end and an outlet end;

(b) an inlet end plate adjacent the inlet end of the tank and having an inlet opening;

(c) a discharge end plate adjacent the outlet end of the tank and having an outlet opening;

(d) a support core received within the tank having one end adjacent the outlet end plate and its other end adjacent the inlet end plate and terminating downstream of the inlet opening such that there is a gap between the end of the core and the inlet plate to allow food product to enter through the inlet opening;

(e) an auger carried by the support core;

(f) a perforate cylindrical wall enclosing the auger and extending from the inlet end plate to the discharge end plate;

(g) at least two support channels extending between and connecting the inlet end plate to the discharge end plate wherein the end plates, perforate cylindrical wall, and support channels define a drum rotatably received in the tank; and (h) at least two braces connecting the core to the inlet end plate while spacing the core from the inlet end plate with each brace being of non-straight construction for spacing the brace where it is attached to the inlet end plate radially outwardly away from the outer radial edge of the inlet opening for providing sufficient space within the drum adjacent the inlet opening for permitting substantially unobstructed entry of food product into the drum.

* * * * *